H. A. JAMIESON.
Improvement in Slide-Valves.

No. 132,665.  Patented Oct. 29, 1872.

Witnesses:
Fred Haymer
R. E. Rabeau

Henry A Jamieson

UNITED STATES PATENT OFFICE.

HENRY A. JAMIESON, OF WILLIAMSBURG, BROOKLYN, NEW YORK.

IMPROVEMENT IN SLIDE-VALVES.

Specification forming part of Letters Patent No. 132,665, dated October 29, 1872.

*To all whom it may concern:*

Be it known that I, HENRY A. JAMIESON, of Williamsburg, Brooklyn, in the county of Kings and State of New York, have invented a new and useful Improvement in Slide-Valves; and I do hereby declare that the following is a full, clear, and exact description of the same, reference being had to the accompanying drawing forming part of this specification, and in which—

Figure 1:
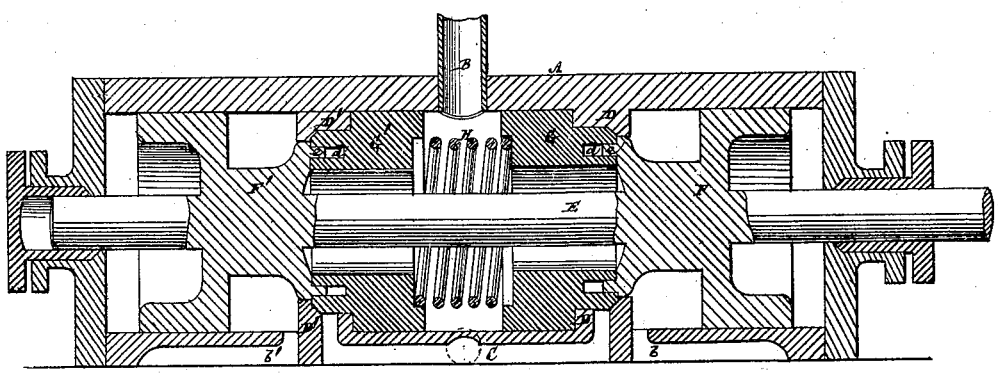
Figure 2:
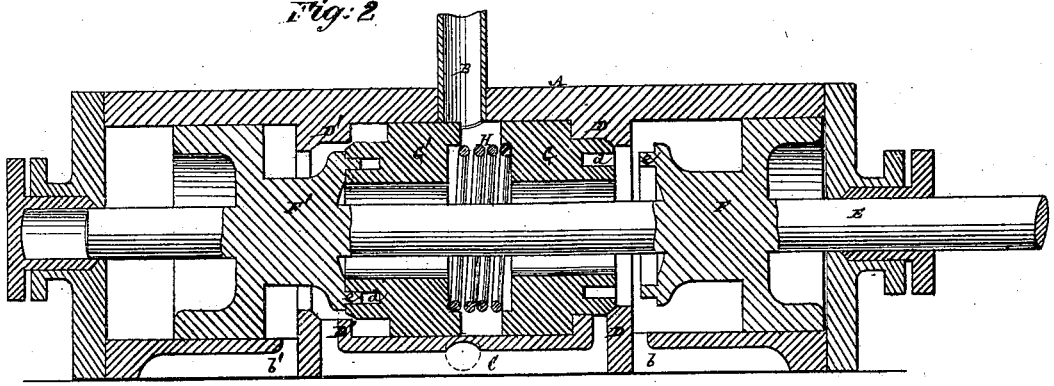

Figure 1 represents a longitudinal sectional view of the valve when at rest in a closed position, and Fig. 2 a similar view of the valve in one of its open positions.

Similar letters of reference indicate corresponding parts.

This invention consists in a novel construction of cylindrical slide-valves and the cylinders or cases in which they work, the same including a certain combination of sliding valvular rings and piston-valves with fixed rings and ports or passages, whereby a balanced action may be obtained for the valve, and great durability with freedom of motion is insured. Although applicable to different purposes or uses and for controlling various fluids, vapors, or gases, said valve will here be described as used for controlling the reciprocating piston of a steam-engine.

In the accompanying drawing, A represents the cylinder or case in which the valve reciprocates to open and close ports or passages $b$ $b'$, alternately, to communication with a steam-inlet, B, and exhaust-outlet C, said ports $b$ $b'$ connecting with opposite ends of the engine-cylinder. D D' are interior rings, fast to the valve-cylinder A at the inner ends of the passages $b$ $b'$, and at equal distances, or thereabout, from the steam-inlet B. The valve is composed in part of a central stem, E, arranged to project through the one end of the cylinder A, for reciprocating action in direction of its length by an eccentric, or otherwise. Fast to said stem are two piston-valves, F F', arranged to travel in close contact with the portions of the cylinder A, bound by the ends of the cylinder and the rings D D; also being capable, at their inner or valvular portions, of motion within or through said rings, such valvular portions being of a reduced diameter, relatively, with the pistons they are attached to or form part of, and so that when either of said valvular portions project through the stationary rings D D' communication is established past or round them, between either port $b$ or $b'$, and the exhaust-passage C. G G' are loose rings, closely but freely fitted to move independently of one another within and along the central portion of the cylinder A, between the rings D D'. These loose rings also constitute valves, closing against the stationary rings D D', and projecting within them so as to close the ends of the exhaust-passages which open through the stationary rings; and said loose rings G G' have passages through them outside of or around the stem E. The outer faces or said loose rings form valve-seats for the piston-valves F F', and have grooves $d$ $d$ in them, within which correspondingly-shaped ribs $e$ $e$ on the faces of the piston-valves enter to form a steam or air cushion for the valves in closing, and so do away with slamming of the valves. The grooves $d$ $d$ may also contain cushioning packing. H is a spring, interposed between the loose rings G G' to keep them in proper relation with each other, and closed when the whole valve is at rest in its stopped position.

It is not absolutely essential, but preferable, in a general way, that the piston-valves F F' and loose rings G G' should be of the same diameters; but they will here, for the purpose of giving the valve a balance action, be referred to as of like diameters. Supposing the valve to be in a closed position, as represented in Fig. 1, then it will be evident that steam entering at the inlet B presses equally upon the inner faces of the loose rings G G' and piston-valves F F', fast on the stem E, consequently the valve is perfectly balanced when closed. Nor is this balance interfered with when the valve is open. Thus, supposing it to be moved to the right, as represented in Fig. 2, then the area presented to the steam by the piston-valve F is equal to the combined areas of the loose ring G' and inner or valvular portion of the piston-valve F' under exposure to steam, and exerting a reverse effect upon the stem E to that produced by the pressure of the steam on the piston-valve F, and the steam passes through the ring G and in front of and around the open valve F to the port $b$, while the exhaust from the engine is open by the port $b'$ through the ring D', and around or past the closed valve F' to the outlet C. Upon a reverse movement taking place of the whole valve, the ring G' is closed against and within the ring D', the valve F' opened, the valve F closed, and the ring opened, thereby changing the courses of the live and spent steam relatively to the ports $b\ b'$; but in both movements of the entire valve there is the same counteracting pressure of the steam in direction of the travel of the valve, and exemption from lateral pressure, which serves to insure freedom of motion to the valve, combined with great durability by reason of the absence of excessive friction.

What is here claimed, and desired to be secured by Letters Patent, is—

1. The combination of the piston-valves F F', fast to the reciprocating stem E, the loose rings G G', the stationary rings D D', and the cylinder A with its inlet B, outlet C, and ports or passages $b\ b'$, substantially as specified.

2. The combination of the spring H with the subject-matter of the preceding clause of claim.

HENRY A. JAMIESON.

Witnesses:
FRED. HAYNES,
R. E. RABEAU.